S. A. HOLLOWAY.
ROASTING PAN.
APPLICATION FILED OCT. 17, 1917. RENEWED OCT. 1, 1919.
1,339,625.  Patented May 11, 1920.
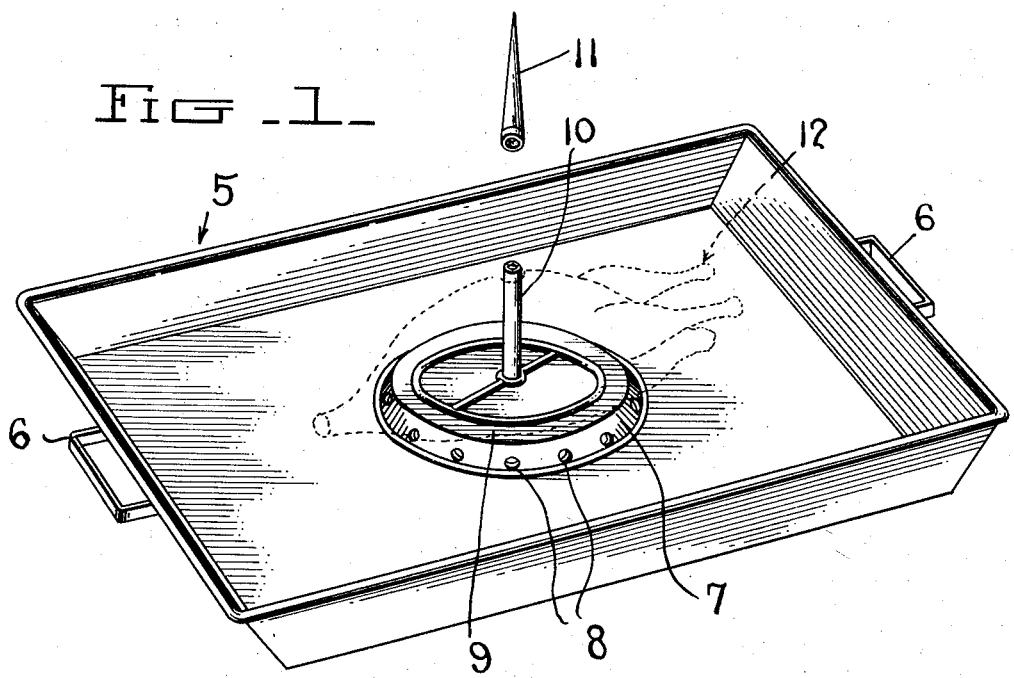
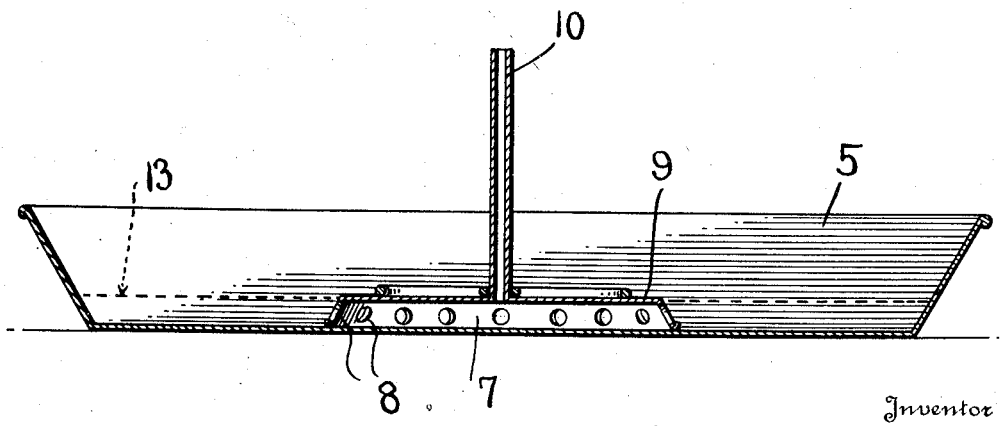
Inventor
Sarah A. Holloway
By Adam E. Fisher
Attorney

UNITED STATES PATENT OFFICE.

SARAH ANN HOLLOWAY, OF HEREFORD, TEXAS.

ROASTING-PAN.

1,339,625.   Specification of Letters Patent.   Patented May 11, 1920.

Application filed October 17, 1917, Serial No. 197,001. Renewed October 1, 1919. Serial No. 327,833.

*To all whom it may concern:*

Be it known that I, SARAH ANN HOLLOWAY, a citizen of the United States, residing in the town of Hereford, in the county of Deaf Smith, State of Texas, have invented new and useful Improvements in Roasting-Pans, of which the following is a specification, reference being had to the accompanying drawings.

The present invention relates to new and useful improvements in roasting pans.

The primary object of the invention is the provision of a roasting pan which is self basting.

Another object of the invention is the provision of a roasting pan having a perforated support and an impaling tube extended therefrom and upon which the article to be roasted is impaled.

Another object of the invention is the provision of a removable pointed tip for said impaling tube to enable the placing of the article to be cooked thereon.

A further object of the invention is the provision of a roaster having a perforated support upon which the article to be cooked is rested and an impaling tube designated to be inserted through the article and through which the juices of the meat being cooked are transferred upwardly and allowed to flow down over the said meat.

A still further object of the invention is to improve and simplify devices of this character rendering them comparatively simple and inexpensive to manufacture, reliable and efficient in use, and readily operated.

With the above and other objects in view the present invention resides in the novel features of construction, formations, combinations and arrangements of parts to be hereinafter more fully described, claimed and illustrated in the accompanying drawing forming a part of the present application, it being understood in this connection that various minor changes in the specific details of construction can be resorted to within the scope of the appended claims without departing from the spirit or sacrificing any of the advantages of the invention.

In the drawing;

Figure 1 is a perspective view of a pan constructed in accordance with the present invention; and Fig. 2 is a transverse sectional view thereof.

Referring now to the accompanying drawing by similar characters of reference throughout the several views, the numeral 5 designates in general a baking pan which can be of any well known shape and size. In the drawing, however, for the purposes of illustration a rectangular shape pan is shown provided at its opposite ends with suitable handles 6.

A supplementary pan 7 is positioned in the central portion of the pan 5 and is provided with a plurality of perforations 8 through which the gravy contained within the main pan 5 can flow therein.

The bottom 9 of this supplementary pan 7 is preferably spaced above the bottom of the pan 5 and extending centrally therefrom perpendicularly to the bottom of the pan 5 is a tube 10.

This tube 10 is provided with a removable impaling tip 11 for a purpose to be later explained.

In use the tip 11 is placed upon the upper end of the tube 10 and the article to be roasted is impaled thereon as clearly shown in Fig. 1 of the drawing.

After the article shown at 12 is positioned properly the tip 11 is then removed and the pan 5 placed in the oven.

It will be noted that as the gravy or juices shown at 13 begin to boil they will flow upwardly through the tube 10 and back into the pan over the article of food impaled on said tube.

It will be noted that the basting attachment including the pan 7 and tube 10 can be placed in any pan desired or it can be fixed permanently into a pan but it is preferred that the same be removable to enable easy cleaning of the device.

When in use the attachment prevents the roast or article of food being cooked from burning by virtue of its being roasted from the bottom of the pan 5 and it also enables the center of the meat to be cooked as tender as the outside thereof by virtue of the tube 10 passing therethrough.

If during the cooking operation it is desired to stop the flow of the gravy or the like through the tube 10 the cap 11 can be replaced.

From the foregoing description taken in connection with the accompanying drawing it will be manifest that a basting attachment for pans or the like is provided which will fulfill all of the necessary requirements of such a device.

Having thus fully described the invention what I claim is new and desire to protect by Letters Patent is:—

1. In a device of the character described the combination with a pan, a secondary perforated pan positioned therein, a basting tube extending from the secondary perforated pan and an impaling cap removably carried by the basting tube.

2. In a device of the character described the combination of a roasting pan or the like, a secondary pan positioned therein having its bottom spaced from the bottom of the pan, said secondary pan having perforations provided therein, a basting tube extending from the bottom of the secondary pan and a removable impaling cap carried by the basting tube.

3. In a device of the character described the combination with a roasting pan, of a support for receiving meat or the like removably positioned within said roasting pan, said support having its bottom spaced above the bottom of the pan for supporting the article to be cooked in spaced relation above said pan, said support having perforations formed therein, a tube carried by the support and extending vertically from the central portion thereof, said tube adapted to extend through the article to be cooked for delivering gravy from the container to the upper side of said article, and a removable impaling tip carried by said tube to assist in the impaling of the article to be cooked thereon and to prevent the flow of gravy or the like through said tube when desired.

4. A basting device comprising a basal support; a tube mounted on said support and communicating with the under side thereof; and a removable, pointed tip for the upper end of said tube.

5. A basting device comprising a hollow base; a tube mounted upon and vertically extending from said base and communicating with the interior thereof; and a removable pointed tip for the upper end of said tube.

SARAH ANN HOLLOWAY.

Witnesses:
JEWEL FREEMAN,
FLOSSIE WITTEN.